(12) United States Patent
Ravich et al.

(10) Patent No.: US 11,093,435 B2
(45) Date of Patent: Aug. 17, 2021

(54) EFFICIENT ESTABLISHMENT ON RDMA PEER-TO-PEER CONNECTIONS

(71) Applicant: EMC IP HOLDING COMPANY LLC, Hopkinton, MA (US)

(72) Inventors: Leonid Ravich, Yatzitz (IL); Eldad Zinger, Holon (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 63 days.

(21) Appl. No.: 16/592,231

(22) Filed: Oct. 3, 2019

(65) Prior Publication Data
US 2021/0103548 A1 Apr. 8, 2021

(51) Int. Cl.
*G06F 15/173* (2006.01)
*H04L 29/08* (2006.01)

(52) U.S. Cl.
CPC ...... *G06F 15/17331* (2013.01); *H04L 67/104* (2013.01); *H04L 67/1097* (2013.01)

(58) Field of Classification Search
CPC ............. G06F 15/17331; H04L 67/104; H04L 67/1097
See application file for complete search history.

(56) References Cited

U.S. PATENT DOCUMENTS

2019/0303345 A1* 10/2019 Zhu ..................... G06F 12/1072
2020/0396133 A1* 12/2020 Guller ..................... H04L 41/12

\* cited by examiner

*Primary Examiner* — Wing F Chan
*Assistant Examiner* — Billy H Ng
(74) *Attorney, Agent, or Firm* — Daly, Crowley Mofford & Durkee, LLP

(57) ABSTRACT

A method is disclosed comprising: instantiating, on a first device, a plurality of first connection objects; generating, by the first device, a first set of connection parameters that is associated with the plurality of first connection objects; transmitting the first set of connection parameters from the first device to a second device; receiving from the second device a second set of connection parameters, the second set of connection parameters being associated with a plurality of second connection objects that are instantiated on the second device; updating, by the first device, each of the first connection objects based on the second set of connection parameters; and transmitting, from the first device to the second device, a confirmation that a plurality of communications channels is established.

12 Claims, 6 Drawing Sheets

| 150A | | 204 | | 206 | |
|---|---|---|---|---|---|
| 212 — REMOTE NODE ADDRESS VECTOR | VAL_1A | 232a | VAL_1B | 232b |
| 214 — RECEIVE QUEUE PACKET SERIAL NUMBER | VAL_2A | 234a | VAL_2B | 234b |
| 216 — RETRY COUNT | VAL_3A | 236a | VAL_3B | 236b |
| 218 — DESTINATION QP NUMBER | VAL_4A | 238a | VAL_4B | 238b |

FIG. 2A

| 160A | | 206 | | 204 | |
|---|---|---|---|---|---|
| 212 — REMOTE NODE ADDRESS VECTOR | VAL_1B | 232a | VAL_1A | 232b |
| 214 — RECEIVE QUEUE PACKET SERIAL NUMBER | VAL_2B | 234a | VAL_2A | 234b |
| 216 — RETRY COUNT | VAL_3B | 236a | VAL_3A | 236b |
| 218 — DESTINATION QP NUMBER | VAL_4B | 238a | VAL_4A | 238b |

| | |
|---|---|
| 262 — PARAMETER 212 (*REMOTE NODE ADDRESS VECTOR*) | COMMON |
| 264 — PARAMETER 214 (*RECEIVE QUEUE PACKET SERIAL NUMBER*) | DERIVABLE |
| 266 — PARAMETER 216 (*RNR RETRY COUNT*) | COMMON |
| 268 — PARAMETER 218 (*DESTINATION QP NUMBER*) | UNIQUE |

EFFICIENT ESTABLISHMENT ON RDMA PEER-TO-PEER CONNECTIONS

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided comprising: instantiating, on a first device, a plurality of first connection objects; generating, by the first device, a first set of connection parameters that is associated with the plurality of first connection objects; transmitting the first set of connection parameters from the first device to a second device; receiving from the second device a second set of connection parameters, the second set of connection parameters being associated with a plurality of second connection objects that are instantiated on the second device; updating, by the first device, each of the first connection objects based on the second set of connection parameters; and transmitting, from the first device to the second device, a confirmation that a plurality of communications channels is established, wherein each of the communication channels is associated with a different object pair, each object pair including a respective one of the plurality of first connection objects and a respective one of the plurality of second connection objects.

According to aspects of the disclosure, an electronic device is provided, comprising: a memory; and at least one processor operatively coupled to the memory, the at least one processor being configured to perform the operations of: instantiating a plurality of first connection objects; generating a first set of connection parameters that is associated with the plurality of first connection objects; transmitting the first set of connection parameters to a remote device; receiving from the remote device a second set of connection parameters, the second set of connection parameters being associated with a plurality of second connection objects that are instantiated on the remote device; updating each of the first connection objects based on the second set of connection parameters; and transmitting, to the remote device, a confirmation that a plurality of communications channels is established, wherein each of the communication channels is associated with a different object pair, each object pair including a respective one of the plurality of first connection objects and a respective one of the plurality of second connection objects.

According to aspects of the disclosure, a non-transitory computer-readable medium is provided that stores one or more processor-executable instructions, which when executed by at least one processor cause the at least one processor to perform the operations of: instantiating a plurality of first connection objects; generating a first set of connection parameters that is associated with the plurality of first connection objects; transmitting the first set of connection parameters to a remote device; receiving from the remote device a second set of connection parameters, the second set of connection parameters being associated with a plurality of second connection objects that are instantiated on the remote device; updating each of the first connection objects based on the second set of connection parameters; and transmitting, to the remote device, a confirmation that a plurality of communications channels is established, wherein each of the communication channels is associated with a different object pair, each object pair including a respective one of the plurality of first connection objects and a respective one of the plurality of second connection objects.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 2A is a diagram of an example of a communications object, according to aspects of the disclosure;

FIG. 2B is a diagram of an example of a communications object, according to aspect of the disclosure;

FIG. 2C is a diagram illustrating a plurality of communications object parameters, according to aspect of the disclosure;

FIG. 2D is a diagram illustrating an example of composite parameter sets, according to aspects of the disclosure;

DETAILED DESCRIPTION

Before describing embodiments of the concepts, structures, and techniques sought to be protected herein, some terms are explained. In some embodiments, the term "I/O request" or simply "I/O" may be used to refer to an input or output request. In some embodiments, an I/O request may refer to a data read or write request.

Figure 1A:
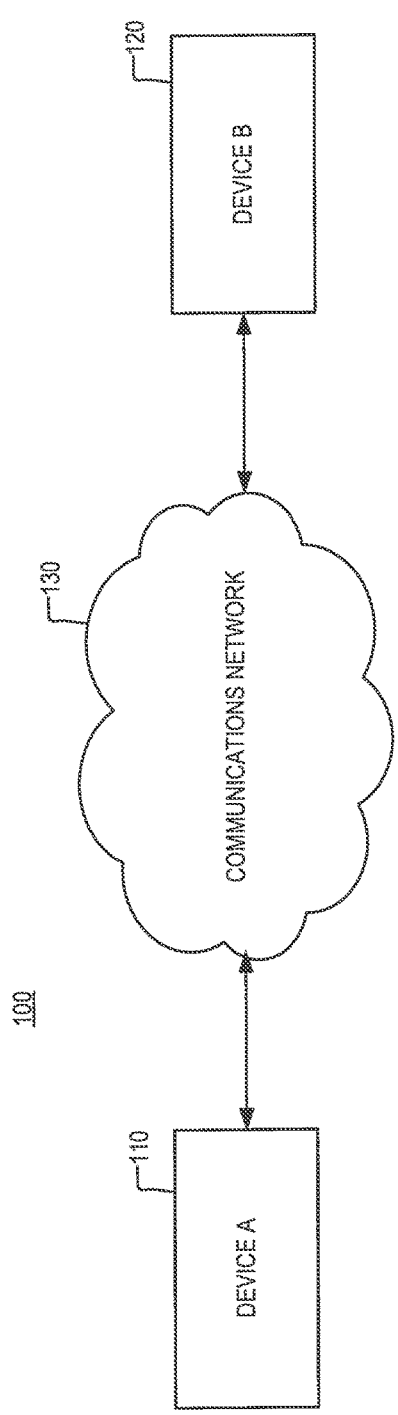
FIG. 1A is a diagram of an example of a system, according to aspects of the disclosure.

FIG. 1A is a diagram of an example of a system 100, according to aspects of the disclosure. The system 100 may include a device 110 that is coupled to a device 120 via a communications network 130. Device 110 may include any suitable type of computing device, such as a desktop computer, a storage server, a smartphone, an embedded system, etc. Device 120 may include any suitable type of computing device, such as a desktop computer, a storage server, a smartphone, an embedded system, etc. The communications network 130 may include any suitable type of communications network, such as the Internet, an Ethernet network, a TCP/IP network, an InfiniBand network, a wide area network (WAN), a local area network (LAN), etc.

Figure 1B:
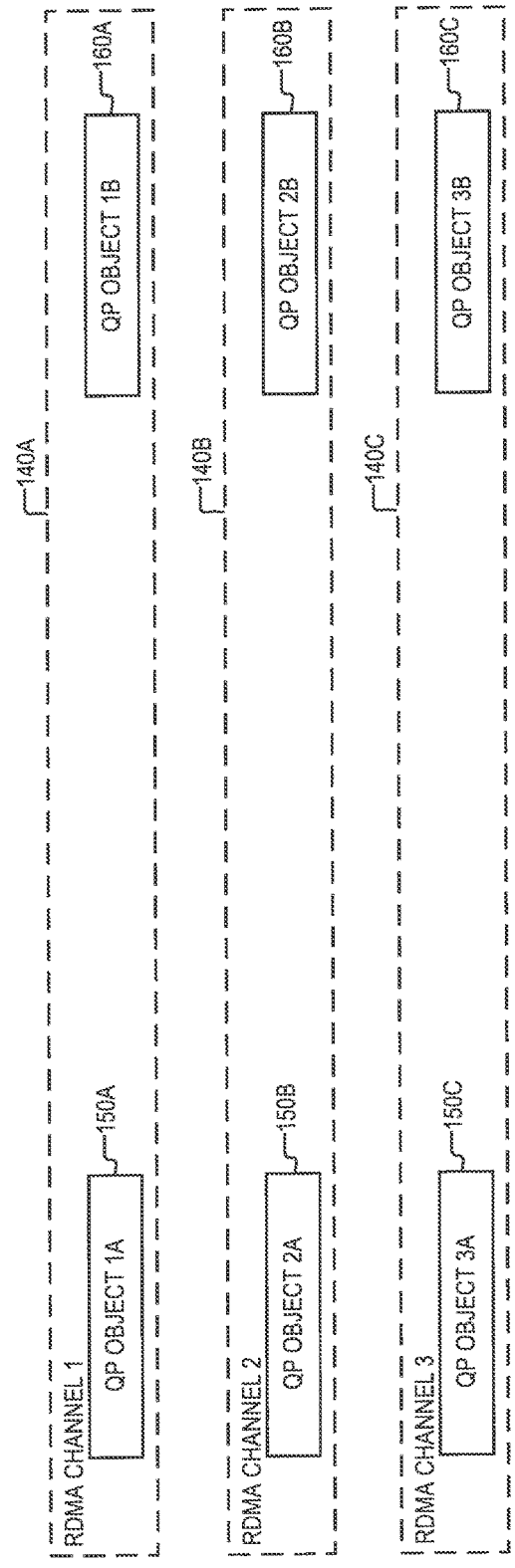
FIG. 1B is a diagram illustrating an example of a plurality of communications channels, according to aspects of the disclosure.

FIG. 1B is a diagram of a plurality of Remote Direct Memory Access (RDMA) channels 140 that are established between device 110 and device 120. As illustrated, each channel 140 is established by using a different pair of queue-pair (QP) objects. Specifically, channel 140A may be established by using a QP object 150A that is instantiated on device 110 and a QP object 160A that is instantiated on device 120; channel 140B may be established by using a QP object 150B that is instantiated on device 110 and a QP object 160B that is instantiated on device 120; and channel 140C may be established by using a QP object 150C that is instantiated on device 110 and a QP object 160C that is instantiated on device 120. As the name suggests, each of the QP objects may include a send queue and a receive queue, which are used for the transmission and receipt of messages. In addition, each of the QP objects 150/160 may include various connection parameters that are used to establish and operate that object's respective channel 140.

FIG. 2A is a diagram of an example of QP object 150A, according to aspects of the disclosure. As illustrated, the QP object 150A may include two groups of values (204 and 206) for connection parameters 212-216. The group 204 may include values for connection parameters 212-216 that are generated by (or otherwise associated with) device 110. The group 206 may include values for connection parameters that are generated by (or otherwise associated with) device 120.

Connection parameter 212 is a remote node address vector. Value 232a of connection parameter 212 may include a set of values that are used by device 120 to send data to device 110 over channel 140a. Such connection parameters may include routing information, a port number at which device 110 is listening, a network address of device 110, etc. Value 232b of connection parameter 212 may include a set of connection parameters that are used by device 110 to send data to device 120 over channel 140a. Such values may include routing information, a port number at which device 120 is listening, a network address of device 120, etc.

Connection parameter 214 is a receive queue packet serial number identifier (RQ PSN). The value 234a of connection parameter 214 may specify the beginning serial number of messages that are transmitted by device 110 to device 120 over channel 140a. The value 234b of connection parameter 214 may specify the beginning serial number of messages that are transmitted by device 120 to device 110 over channel 140a.

Connection parameter 216 is a retry count. The value 236a of connection parameter 216 specifies the number of retransmits per packet (by device 110) over channel 140a before an error is generated in device 110. The value 236b of connection parameter 216 specifies the number of retransmits per packet (by device 120) over channel 140A before an error is generated in device 120.

Connection parameter 218 is a destination QP number. The value 238a of connection parameter 218 may be an identifier that is accorded to the QP object 150a by device 110. The value 238b may be an identifier that is accorded to the QP object 160a by device 120. In other words, the values 238a and 238b together identify a pair of objects, that are instantiated on different devices, and which are used to establish an RDMA channel (e.g., the channel 140a in the present case) between the devices.

Connection parameters 216-218 are provided as an example only. Those of ordinary skill in the art will recognize that various other connection parameters may be used in the establishment and operation of an RDMA channel, such as sender queue packet serial number (SQ PSN), a number of responder resources for RDMA READ/Atomic operations, minimum RNR NAK timer, and an RNR retry count. Further information about various connection parameters that can be used in the establishment of an RDMA channel can be found in RFC 5040, titled A Remote Direct Memory Access Protocol Specification, which is published by the Network Working Group, and which is herein incorporated by reference.

FIG. 2B is a diagram of an example of the QP object 160a. As illustrated, the QP object 160a may also include value groups 204 and 206. FIG. 2B is provided to illustrate that the two QP objects that are used to establish the same channel 140 may include the same groups of connection parameter values. According to the example of FIG. 2B, when channel 140 is established, device 110 may generate the values in group 204, and send those values to device 120. Upon receiving the values in group 204, device 120 may store the values in group 204 in the QP object 150a. Similarly, when channel 140 is established, device 120 may generate the values in group 206, and send those values to device 110. Upon receiving the values in group 206, device 110 may store the values in group 206 in the QP object 160a. In other words, to establish channel 140a, the devices 110 and 120 may conduct a handshake in which the connection parameter values in groups 204 and 206 are exchanged.

Figure 3:
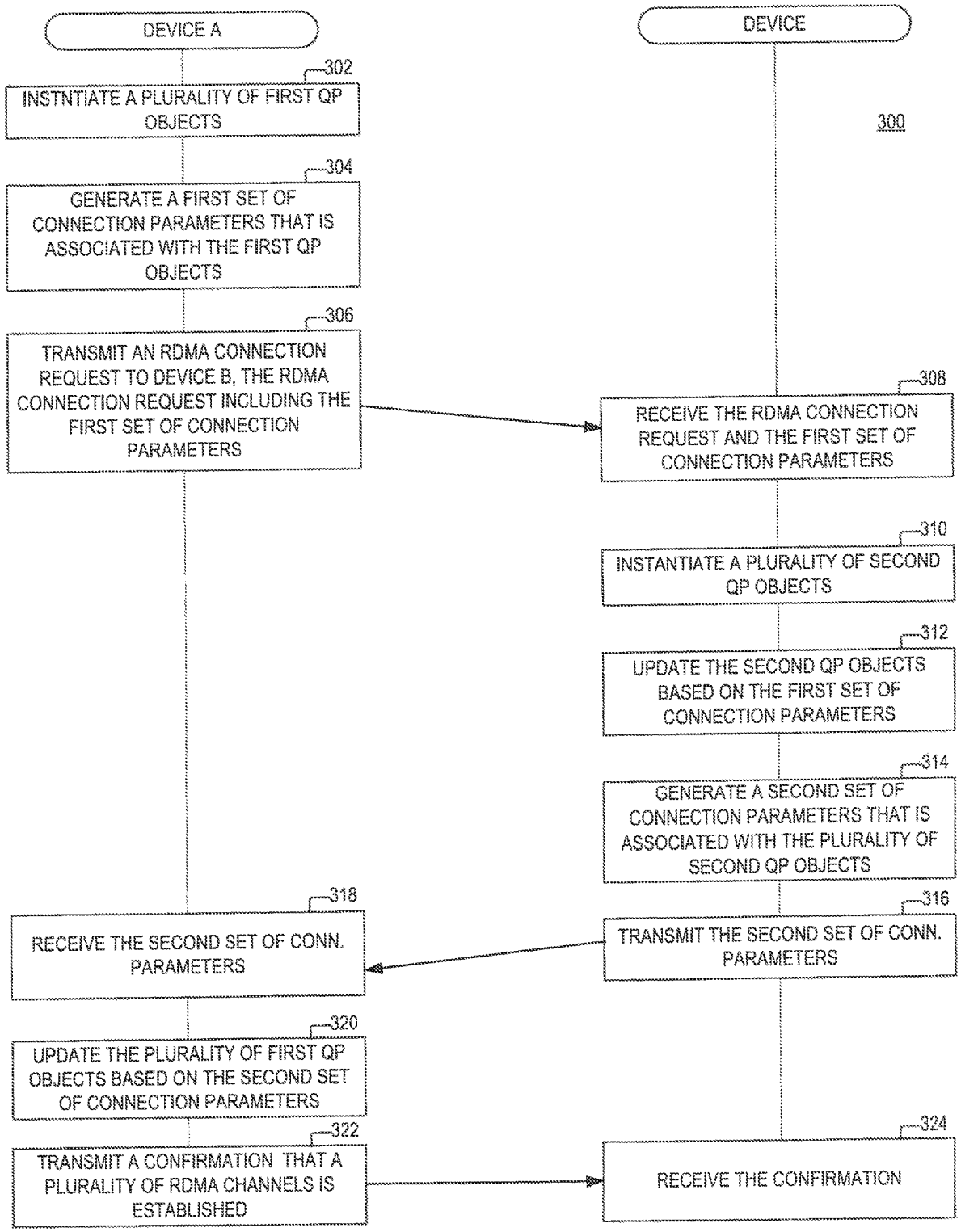
FIG. 3 is a flowchart of an example of a process, according to aspects of the disclosure.
Figure 4:
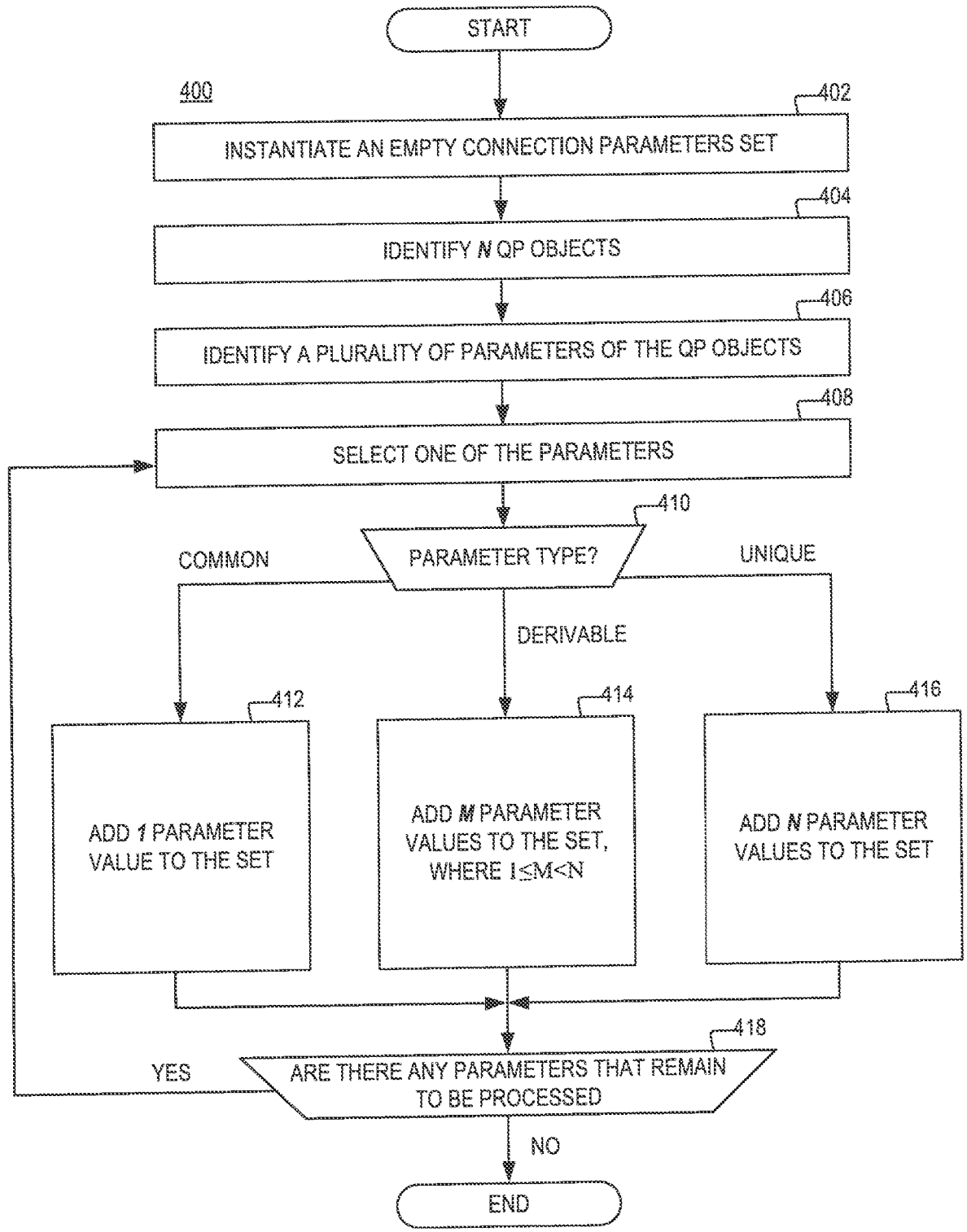
FIG. 4 is a flowchart of an example of a process, according to aspects of the disclosure.
Figure 5:
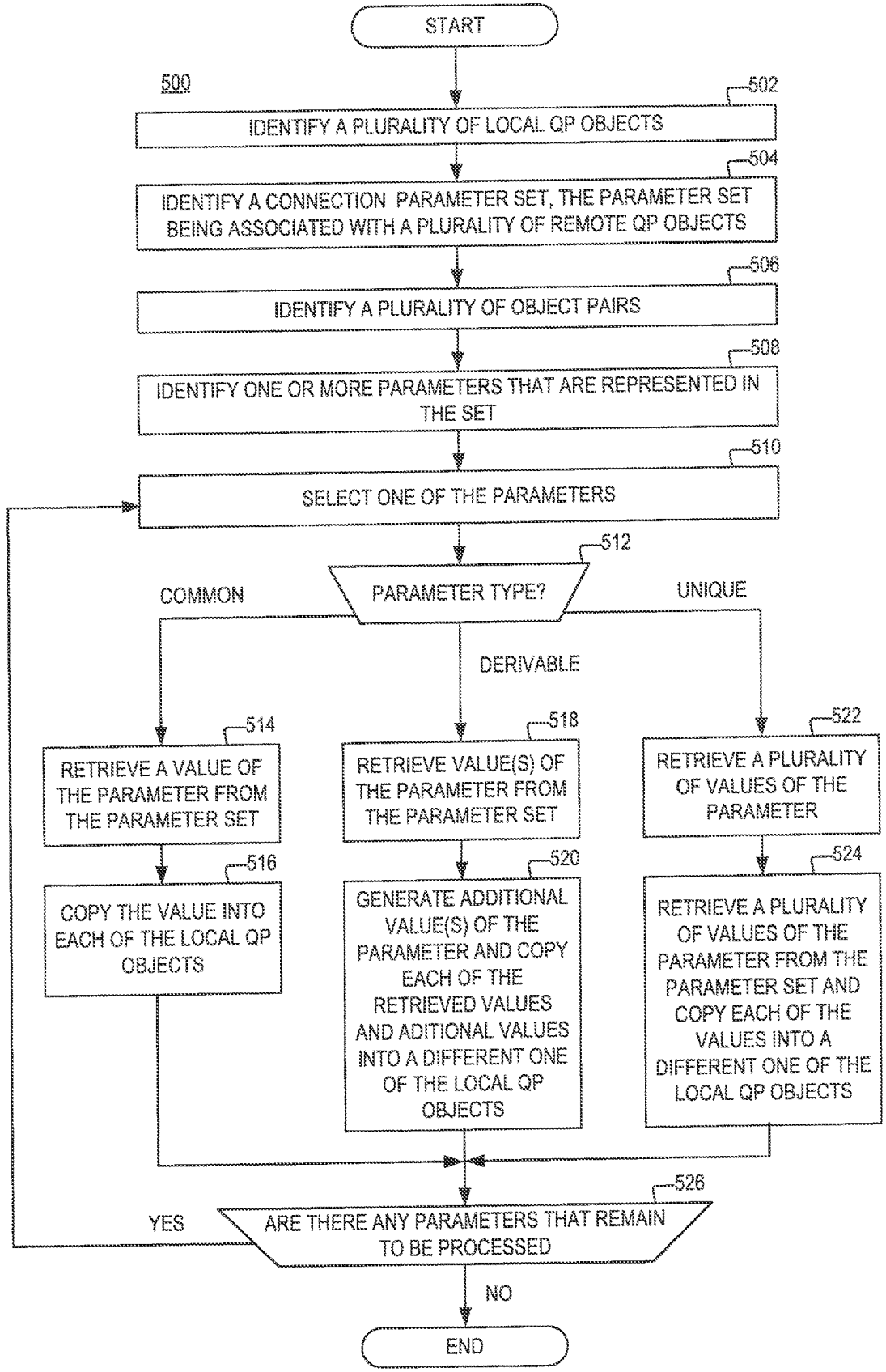
FIG. 5 is a flowchart of an example of a process, according to aspects of the disclosure.

FIGS. 1A-1B illustrate an example in which three channels 140 are established between devices 110 and 120. Normally, when multiple RDMA channels are established between two devices, a different handshake may need to be performed to establish each channel. However, this approach may be time-consuming and inefficient in applications in which a large number of RDMA channels needs to be established between the same two devices. In this regard, FIGS. 3-5 provide an example of process(es) which can be used to establish multiple channels with the same handshake. These process(es) are advantageous because they can increase the efficiency and/or speed at which multiple RDMA channels are established between the same two devices.

Furthermore, FIGS. 1A-1B illustrate an example in which three channels 140 are established between the devices 110 and 120. Each channel 140 is established by using a different pair of QP objects 150 and 160. Each of the QP objects 150/160 may include respective values for connection parameters 212-218. For some connection parameters, each of the QP objects 150/160 may have the same value. On the other hand, for other connection parameters, each of the QP objects 150/160 may have different values. In other words, the content of any of the QP objects 150 may be partially redundant with the content of another one of the QP objects 150. Similarly, the content of any of the QP objects 160 may be partially redundant with the content of another one of the QP objects 160. In some implementations, the process(es) that are discussed with respect to FIGS. 3-5 take advantage of this redundancy to increase the speed and/or efficiency at which multiple RDMA channels are established between the two devices.

FIG. 2C shows an example of a data structure 250 for determining a classification of the connection parameters 212-218. According to the present example, the connection parameter 212 is classified as a common connection parameter, connection parameter 214 is classified as a derivable connection parameter, connection parameter 216 is classified as a common connection parameter, and connection parameter 218 is classified as a unique connection parameter. To distinguish between different values for the same connection parameter (for the same channel), any connection parameter value that is generated by the device 110 is herein referred to as a "first value" of the connection parameter, and any connection parameter value that is generated by device 120 is herein referred to as a "second value" of the connection parameter. Under this nomenclature, value 232a is the first value of connection parameter 212 and value 232b is the second value of connection parameter 212; value 234a is the first value of connection parameter 214 and value 234b is the second value of connection parameter 214; value 236a is the first value of connection parameter 216 and value 236b is the second value of connection parameter 216; and value 238a is the first value of connection parameter 218 and value 238b is the second value of connection parameter 218.

In a set of channels between two devices, a common connection parameter may include any connection parameter whose first value (and/or second value) is the same for all channels. In the example of FIGS. 1B-2B, channels 140a, 140b, and 140c may all have the same first value for connection parameter 212 (i.e., remote address vector), and for this reason connection parameter 212 (i.e., remote address vector) is considered a common connection parameter. As can be readily appreciated, the same remote address vector can be used to send messages to device 120, irrespective of channel 140 that is associated with the messages. Furthermore, in the example of FIGS. 1B-2B, the channels 140a, 140b, and 140c may all have the same first value for connection parameter 216 (i.e., retry count), and for this reason connection parameter 212 (i.e., retry count) is classified as a common connection parameter. As can be readily appreciated, in many applications, there would be no need to have different retry count policies for different RDMA channels.

When channels 140 are established, device 110 may instantiate QP objects 150a, 150b, and 150c and device 120 may instantiate QP objects 160a, 160b, and 160c. Next, device 110 may insert the value 232a of connection parameter 212 in each of QP objects 150a, 150b, and 150c. Similarly, device 110 may insert the value 236a of connection parameter 216 in each of QP objects 150a, 150b, and 150c. Next, device 110 may transmit the values 232a and 236a to device 120. Next, device 120 may insert the value 232a of connection parameter 212 in each of QP objects 160a, 160b, and 160c. Similarly, device 120 may insert the value 236a of connection parameter 216 in each of QP objects 160a, 160b, and 160c.

In a set of channels between two devices, a unique connection parameter is a connection parameter whose first value (and/or second value) is different for each channel. Channels 140a, 140b, and 140c may all have a different first value for connection parameter 218 (i.e., destination QP number), and for this reason connection parameter 218 is considered a unique connection parameter. As can be readily appreciated, device 110 may use a different receive queue for each of the channels 140a, 140b, and 140c in order to differentiate between messages that associated with different ones of the channels 140a, 140b, and 140c. In some implementations, the first value of connection parameter 218 for each of the channels 140 (or QP objects 150) may be allocated in the order in which the channels (or QP objects 150) are instantiated. For instance, the channel 140 (or QP object 150) that is instantiated first may be assigned the lowest first value for connection parameter 218; the channel 140 (or QP object 150) that is instantiated second may be assigned the second-lowest first value for connection parameter 218; the channel 140 (or QP object 150) that is instantiated third may be assigned the third-lowest first value for connection parameter 218. According to the present example, channel 140a (or QP object 150a) is instantiated first, channel 140b (or QP object 150b) is instantiated second, and channel 140c (or QP object 150c) is instantiated last.

When channels 140 are established, device 110 may instantiate QP objects 150a, 150b, and 150c and device 120 may instantiate QP objects 160a, 160b, and 160c. Next, device 120 may generate the value 238a of connection parameter 218 and insert the value 238a in QP object 150a. Next, device 110 may generate a value 238a' and insert the value 238a' in the object 150b. Next, device 120 may generate a value 238a" and insert the value 238a" in the object 150c. After the values 238a, 238a', and 238a" are inserted in objects 150a, 150b, and 150c, respectively, device 110 may transmit the 238a, 238a', and 238a" to device 120. And finally, device 120 may insert the values 238a, 238a', and 238a" in QP objects 160a, 160b, and 160c' respectively. According to the present example, the values 238a, 238a', and 238a" are different first values of connection parameter 218, and as such they specify different destination QP number for each of the channels 140.

In a set of channels between two devices, a derivable connection parameter is a connection parameter whose first value for one channel can be derived based on the first value of the same connection parameter for another channel (and/or based on multiple first values of the connection parameter that belong to different other channels). Similarly, in a set of channels between two devices, a derivable connection parameter is a connection parameter whose second value for one channel can be derived based on the second value of the same connection parameter for another channel (and/or based on multiple second values of the connection parameter that belong to different other channels).

In the example of FIGS. 1B-2B, connection parameter 214 (RQ PSN) is a derivable connection parameter. As noted above, RQ PSN specifies the beginning serial number for messages that are transmitted over each channel. The first value of connection parameter 214 can be allocated with a predetermined algorithm. For instance, device 110 may allocate first values for connection parameters 214 in multiples of 1 million. Furthermore, the first value of the connection parameter 214 may be allocated in the order in which the channels 140 (and/or QP objects 150) are instantiated on device 110. For example, to the first channel 140 (or QP object 150) that is instantiated on device 110, device 110 may assign 1×10^6 as the value of connection parameter 214; to the second channel 140 (or QP object 150) that is instantiated on device 110, device may assign 2×10^6 as the first value of connection parameter 214; and to the third channel 140 (or QP object 150) that is instantiated on device 110, device 110 may assign 3×10^6 as the first value of connection parameter 214. As noted above, channel 140a (or QP object 150a) is instantiated first, channel 140b (or QP object 150b) is instantiated second, and channel 140c (or QP object 150c) is instantiated last.

As noted above, the order in which the channels 140 (or QP objects 150) are instantiated by device 110 can be discerned from the first values of the connection parameter 218. Furthermore, as noted above, the first value of connection parameter 214 for any of the channels 140 may be calculated: (1) based on the order in which the channels 140

(or QP objects 150) are instantiated, and (2) the first value of connection parameter 214 for another one of the channels. This, in turn, enables device 120 to populate QP objects 160b and 160c with respective first values for connection parameter 214 based on the first value of connection parameter 214 for QP object 160a. Under this arrangement, instead of transmitting three different first values for connection parameter 214, device 110 may transmit only one such value to device 120, and device 120 may calculate the remaining first values locally. In some respects, this approach is advantageous because it reduces the amount of data that needs to be exchanged by devices 110 and 120 in order for the channels 140 to be established.

More particularly, when channels 140 are established, device 110 may instantiate QP objects 150a, 150b, and 150c and device 120 may instantiate QP objects 160a, 160b, and 160c. Next, device 110 may insert the value 234a of connection parameter 214 in QP object 150a. Next, device 110 may insert a value 234a' in the QP object 150b. Next, device 110 may insert a value 234a" of connection parameter 214 in the QP object 150c. According to the present example, the values 234a, 234a', and 234a" are different first values of connection parameter 214, and as such they specify different RQ PSNs for each of the channels 140.

After the values 234a, 234a', and 234a" are inserted in QP objects 150a, 150b, and 160c, respectively, device 110 may transmit the value 234a to device 120. Next, device 120 may insert the value of 234a of connection parameter 214 in QP object 160a. Next, device 120 may calculate the value 234a' of connection parameter 214 based on the value 234a. Next, device 120 may insert the value 234a' in QP object 160b. And finally, device 120 may calculate a value 234a" of connection parameter 214 based on the value 234a, and insert the value 234a" in QP object 160c.

FIG. 2D depicts an example of composite connection parameter sets 270 and 280, according to aspects of the disclosure. Composite connection parameter sets 270 and 280 may be used to establish channels 140a, 140b, and 140c with a single handshake. Connection parameter set 270 includes a set of a connection parameter values which are transmitted from device 110 to device 120, and which are subsequently used by device 120 to update the QP objects 160a, 160b, and 160c. Connection parameter set 280 includes a set of a connection parameter values which are transmitted from device 120 to device 110, and which are subsequently used by device 110 to update the QP objects 150a, 150b, and 150c.

As illustrated, composite connection parameter set 270 may include, the value 232a, 236a, 234a, 238a, 238a', and 238a", where 238a' is the second value of connection parameter 218 that is inserted in QP object 150b, and 238a" is the second value of connection parameter 218 that is inserted in QP object 150c. In some implementations, the composite connection parameter set 270 may include only one connection parameter value for each common connection parameter that is represented in the set (e.g., connection parameters 212 and 216). Additionally or alternatively, in some implementations, the connection parameter set 270 may include N respective values for each unique connection parameter that is represented in the connection parameter set 270 (e.g., connection parameter 218), wherein N is the total count of channels that are being established with the connection parameter set 270. Additionally or alternatively, in some implementations, the connection parameter set 270 may include M connection parameters values for each derivable connection parameter that is represented in the connection parameter set (e.g., connection parameter 214), where 1≤M<N.

As illustrated, composite connection parameter set 280 may include, the value 232b, 236b, 234b, 238b, 238b', and 238b", where 238b' is the second value of connection parameter 218 that is inserted in QP object 160b, and 238b" is the second value of connection parameter 218 that is inserted in QP object 160c. In some implementations, the composite connection parameter set 280 may include only one connection parameter value for each common connection parameter that is represented in the set (e.g., connection parameters 212 and 216). Additionally or alternatively, in some implementations, the connection parameter set 280 may include N respective values for each unique connection parameter that is represented in the connection parameter set 280 (e.g., connection parameter 218), wherein N is the total count of channels that are being established with the connection parameter set 280. Additionally or alternatively, in some implementations, the connection parameter set 280 may include M connection parameters values for each derivable connection parameter that is represented in the connection parameter set (e.g., connection parameter 214), where 1≤M<N.

In some implementations, each of device 110 and device 120 may be configured to execute logic for calculating the value of a derivable connection parameter for a particular channel 140 (or QP object 150). The logic may be configured to calculate the value of the derivable connection parameter based on one or more other values of the same derivable connection parameter, which are associated with other channels 140. The logic may be implemented in software, in hardware, or as a combination of software and hardware.

FIG. 3 is a flowchart of an example of a process 300 for instantiating a plurality of communications channels. According to the present example, the process 300 is performed by device A and device B. In some implementations, the plurality of communications channels may be the same or similar to the channels 140, which are discussed above with respect to FIGS. 1A-2D. In some implementations, device A may be the same or similar to device 110 and device B may be the same or similar to device 120.

At step 302, device A instantiates a plurality of first QP objects. In some implementations, the plurality of first QP objects may be the same or similar to QP objects 150.

At step 304, device A generates a first set of connection parameters that is associated with the first QP objects. In some implementations, the first set of connection parameters may be the same or similar to the connection parameter set 270. In some implementations, the first set of connection parameters may be generated in accordance with a process 400, which is discussed further below with respect to FIG. 4.

At step 306, device A transmits an RDMA connection request to device B. In some implementations, the RDMA connection request may include the first set of connection parameters, which is generated at step 304. Additionally or alternatively, in some implementations, each of the first QP objects may be identified (explicitly or implicitly) in the first set of connection parameters. For example, as noted above, each value of a unique parameter that is represented in the first set may serve as an identifier of a different respective one of the first QP objects. According to the present example, the RDMA connection request is a request to establish multiple RDMA channels with a single handshake. Additionally or alternatively, in some implementations, the RDMA connection request may identify (explicitly or implicitly) the number of channels that are desired to be established.

At step 308, device B receives the RDMA connection request.

At step 310, device B instantiates a plurality of second QP objects. In some implementations, the plurality of QP objects may be the same or similar to the QP objects 160.

At step 312, device B updates the plurality of second QP objects based on the first set of connection parameters. In some implementations, the plurality of second QP objects may be updated in accordance with a process 500, which is discussed further below with respect to FIG. 5.

At step 314, device B generates a second set of connection parameters that is associated with the second QP objects. In some implementations, the second set of connection parameters may be the same or similar to the parameter set 280. In some implementations, the second set of connection parameters may be generated in accordance with the process 400, which is discussed further below with respect to FIG. 4.

At step 316, device B transmits to device A the second set of connection parameters.

At step 318, device A receives the second set of connection parameters.

At step 320, device A updates the plurality of first QP objects based on the second set of connection parameters. In some implementations, the plurality of second QP objects may be updated in accordance with a process 500, which is discussed further below with respect to FIG. 5.

At step 322, device A transmits to device B a confirmation that the plurality of first QP objects is updated.

At step 324, device B receives the confirmation that the plurality of first objects is updated, and determines that the plurality of RDMA channels have been successfully established.

In some implementations, after the first and second QP objects are instantiated, they may be arranged in pairs. Each object pair may include one first QP object and one second QP object. Each object pair may include a different first QP object and a different second QP object. The objects in each QP pair may be used to establish a different communications channel between device A and device B. In some implementations, the object pairs may be defined implicitly. In such implementations, a given second QP object may be associated with a respective first QP object by inserting, into the given second QP object, the value of a unique parameter that is also part of the respective first QP object. In such implementations, the given first QP object and the respective second QP object may be considered part of the same pair by virtue of containing the same parameter value.

Furthermore, in some implementations, the first and second QP objects may be arranged in pairs in accordance with a convention, which is based on the temporal order in which the first and second QP objects are instantiated. For example, the first QP object that is instantiated first on device A (at step 302) may be paired with the second QP object that is instantiated first on device B (at step 310); the first QP object that is instantiated second on device A (at step 302) may be paired with the second QP object that is instantiated second on device B (at step 310), the first object QP object that is instantiated third on device A (at step 302) may be paired with the second QP object that is instantiated third on device B (at step 310), and so forth.

Furthermore, in some implementations, the first and second QP objects may be updated (at steps 312 and 320), such that the first and second QP objects in each pair include the same parameter values—i.e., the ensure that the same two groups of values are present in each of the QP objects in the pair (see FIGS. 2A-B). Device A may determine which first and second objects QP objects belong in the same pair are updated based on the convention for arranging the first and second QP objects in pairs, and a set of values for a unique parameter that is represented in the second set of parameters. As discussed above with parameter 218, the values of a particular unique parameter may be assigned in the order in which QP objects are instantiated, and as such they may implicitly identify this order.

FIG. 4 is a flowchart of an example of a process 400 for generating a composite parameter set, according to aspects of the disclosure. At step 402, an empty parameter set is instantiated. At step 404, a plurality of QP objects is identified. According to the present example, the plurality includes N QP objects, where N is a positive integer greater than 1. At step 406, a plurality of parameters of the QP objects is identified. At step 408, one of the parameters is selected. At step 410, a determination is made if the selected parameter is a common parameter, a derivable parameter or a unique parameter. If the parameter is a common parameter, the process 400 proceeds to step 412. If the parameter is a derivable parameter, the process 400 proceeds to step 414. And if the parameter is a unique parameter, the process 400 proceeds to step 416. At step 412, only one value of the selected parameter is added to the composite set. The added value may be a value of the parameter that is contained in any of the QP objects. At step 414, M values of the parameter are added to the composite parameter set, where $1 \leq M < N$. The added value may be the value of the parameter that is contained in any of the QP objects. At step 416, the value of the parameter that is contained in each of the QP objects is added to the set.

FIG. 5 is a flowchart of an example of a process for updating a set of QP objects based on a set of parameters, according to aspects of the disclosure. At step 502, a plurality of local QP objects is identified. In some implementations, the plurality of local QP objects may include QP objects that are instantiated on a first device that is device executing the process 500. At step 504, a parameter set for updating the local objects is identified. The parameter set is associated with a plurality of remote QP objects. The remote QP objects may include objects instantiated on a second device, which is desired to be connected to the first device via a plurality of RDMA channels. At step 506, a plurality of object pairs is identified. In some implementations, each object pair may include a different one of the local QP objects and a different one of the remote QP objects. At step 508, one or more parameters are identified that are represented in the parameter set. At step 510, one of the parameters is selected. At step 512, a determination is made if the selected parameter is a common parameter, a derivable parameter or a unique parameter. If the parameter is a common parameter, the process 500 proceeds to step 514. If the parameter is a common parameter, the process 500 proceeds to step 418. And if the parameter is a unique parameter, the process 500 proceeds to step 522. In some implementations, the type of the parameter may be determined by searching a database, such as the data structure 250, which is discussed above with respect to FIG. 2C.

At step 514, a value of the selected parameter is retrieved from the parameter set. At step 516, the retrieved value is copied into each of the local QP objects.

At step 518, one or more values of the selected parameter are retrieved from the parameter set. At step 520, one or more additional values for the parameter are calculated based on the retrieved value(s). Afterwards, each of the retrieved value(s) and the additional QP values is copied into a different one of the local QP objects. In some implementations, copying a retrieved value in one of the local QP objects may include identifying a remote QP object that includes the retrieved value, identifying a local QP object that belongs to the same pair as the identified remote QP object, and copying the retrieved value into the identified local QP object. In some implementations, copying an additional value into one of the local QP objects may include identifying a remote QP object that includes the additional value, identifying a local QP object that belongs to the same object pair as the identified remote QP object, and copying the additional value into the identified local QP object.

At step 522, a plurality of values of the parameter are retrieved from the parameter set. At step 524, each of the retrieved values is copied into a different one of the local QP objects. In some implementations, copying a retrieved value into a one of the local QP objects may include identifying a remote QP object that includes the retrieved value, identifying a local QP object that belongs in the same object pair as the remote QP object, and adding the retrieved value to the identified local QP object. At step 526, a determination is made if there are any parameters that are represented in the parameter set that remain to be processed. If there are, the process returns to step 510, and another one of the parameters is selected. If there are no more parameters that remain to be processed, the process 500 terminates.

In some implementations, the magnitude of each parameter value in a derived set may correspond to the time when the value's respective remote QP object is instantiated. For example, the smallest parameter value in the set may correspond to the remote QP object that was instantiated first among all remote QP objects; the second smallest parameter value in the set may correspond to the remote QP object that was instantiated second among all remote QP objects; the third smallest parameter value in the set may correspond to the remote QP object that was instantiated all remote among all remote QP objects, and so forth. As noted above, in some implementations, the order in which remote objects are instantiated may be determined based on a set of values for a unique parameter that is provided in the same set.

Figure 6:
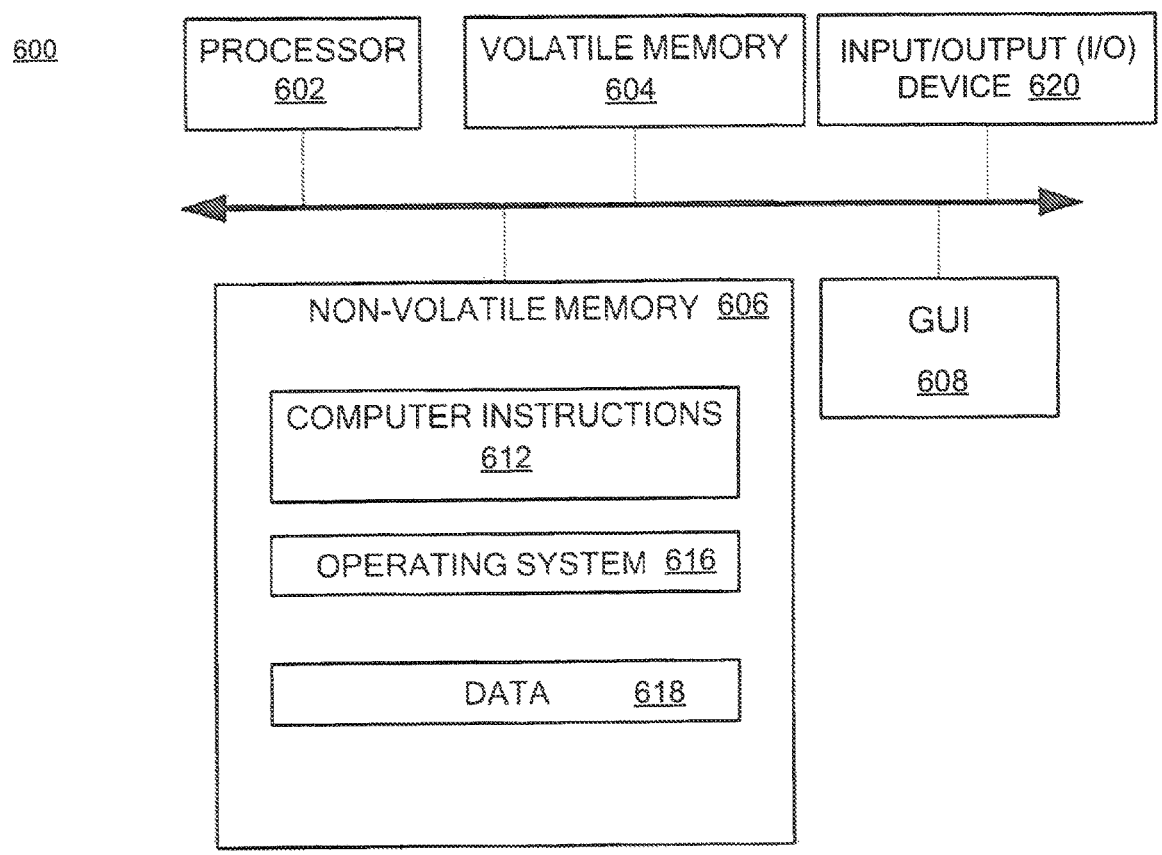
FIG. 6 is a diagram of an example of a computing device, according to aspects of the disclosure.

Referring to FIG. 6, in some implementations, any of the devices 110 and 120 may be implemented as one or more computing devices 600. Each computing device 600 may include processor 602, volatile memory 604 (e.g., RAM), non-volatile memory 606 (e.g., a hard disk drive, a solid state drive such as a flash drive, a hybrid magnetic and solid state drive, etc.), graphical user interface (GUI) 608 (e.g., a touchscreen, a display, and so forth) and input/output (I/O) device 620 (e.g., a mouse, a keyboard, etc.). Non-volatile memory 606 stores computer instructions 612, an operating system 616 and data 618 such that, for example, the computer instructions 612 are executed by the processor 602 out of volatile memory 604 to perform at least a portion of the processes 300-500.

FIGS. 1A-6 are provided as an example only. At least some of the steps discussed with respect to FIGS. 1A-6 may be performed in parallel, in a different order, or altogether omitted. As used in this application, the word "exemplary" is used herein to mean serving as an example, instance, or illustration. Although the examples provided in FIGS. 1A-6 are presented in the context of RDMA, it will be understood that the present disclosure is not limited to any specific communications protocol. In this regard, it will be understood that the techniques presented throughout the disclosure can be used to establish communications channels in accordance with any suitable type of communications protocol. As used throughout the disclosure, the terms "connection" and "channel" are used interchangeably where context permits. Although the examples provided in FIG. 1A-6 are presented in the context of QP objects, it will be understood that the present disclosure is not limited to QP objects only. In this regard, it will be understood that the techniques presented throughout the disclosure can be used in conjunction with other types of connection objects.

Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method comprising:
   instantiating, on a first device, a plurality of first connection objects;
   generating, by the first device, a first set of connection parameters that is associated with the plurality of first connection objects;
   transmitting the first set of connection parameters from the first device to a second device;
   receiving from the second device a second set of connection parameters, the second set of connection parameters being associated with a plurality of second connection objects that are instantiated on the second device;
   updating, by the first device, each of the first connection objects based on the second set of connection parameters, wherein updating each of the first connection objects includes: retrieving a value of a derivable connection parameter from the second set of connection parameters, generating a set of values for the derivable connection parameter based on the retrieved value of the derivable connection parameter; and copying each of the values in the set into a different one of the plurality of first connection objects; and
   transmitting, from the first device to the second device, a confirmation that a plurality of communications channels is established,
   wherein each of the communication channels is associated with a different object pair, each object pair including a respective one of the plurality of first connection objects and a respective one of the plurality of second connection objects.

2. The method of claim 1, wherein:
   generating the first set of connection parameters includes identifying a common connection parameter and inserting a single copy of a value of the common connection parameter in the first set of connection parameters, and
   the common connection parameter includes a parameter having a same value in each of the first connection objects.

3. The method of claim 1, wherein:
   generating the first set of connection parameters includes identifying a unique connection parameter and inserting a plurality of values of the unique connection parameter into the first set of connection parameters, and
   the unique connection parameter includes a connection parameter whose value is different in each of the first connection objects.

4. The method of claim 1, wherein:
   updating the plurality of first connection objects based on the second set of connection parameters further includes retrieving a value of a common connection parameter from the second set of connection parameters and coping the value of the common connection parameter into each of the first connection objects,
   the common connection parameter includes a parameter having a same value in each of the second connection objects.

5. The method of claim 1, wherein updating the plurality of first connection objects based on the second set of connection parameters further includes:
   retrieving a plurality of values of a unique connection parameter from the second set of connection parameters, and
   copying each of the plurality of values into a different one of the plurality of first connection objects.

6. A method comprising:
   instantiating, on a first device, a plurality of first connection objects;
   generating, by the first device, a first set of connection parameters that is associated with the plurality of first connection objects;
   transmitting the first set of connection parameters from the first device to a second device;

receiving from the second device a second set of connection parameters, the second set of connection parameters being associated with a plurality of second connection objects that are instantiated on the second device;

updating, by the first device, each of the first connection objects based on the second set of connection parameters; and transmitting, from the first device to the second device, a confirmation that a plurality of communications channels is established, wherein each of the communication channels is associated with a different object pair, each object pair including a respective one of the plurality of first connection objects and a respective one of the plurality of second connection objects, wherein generating the first set of connection parameters includes identifying a derivable connection parameter and inserting only one value of the derivable connection parameter in the first set of connection parameters, the derivable connection parameter includes a connection parameter whose value is different in each of the plurality of first connection objects, such that a first value of the derivable connection parameter in one of the first connection objects is derivable from a second value of the derivable connection parameter in another one of the first connection objects.

7. An electronic device, comprising:

a memory; and at least one processor operatively coupled to the memory, the at least one processor being configured to perform the operations of:

instantiating a plurality of first connection objects;

generating a first set of connection parameters that is associated with the plurality of first connection objects;

transmitting the first set of connection parameters to a remote device;

receiving from the remote device a second set of connection parameters, the second set of connection parameters being associated with a plurality of second connection objects that are instantiated on the remote device;

updating each of the first connection objects based on the second set of connection parameters, wherein updating each of the first connection objects includes: retrieving a value of a derivable connection parameter from the second set of connection parameters, generating a set of values for the derivable connection parameter based on the retrieved value of the derivable connection parameter; and copying each of the values in the set into a different one of the plurality of first connection objects; and transmitting, to the remote device, a confirmation that a plurality of communications channels is established, wherein each of the communication channels is associated with a different object pair, each object pair including a respective one of the plurality of first connection objects and a respective one of the plurality of second connection objects.

8. The electronic device of claim 7, wherein:

generating the first set of connection parameters includes identifying a common connection parameter and inserting a single copy of a value of the common connection parameter in the first set of connection parameters, and the common connection parameter includes a parameter having a same value in each of the first connection objects.

9. The electronic device of claim 7, wherein:

generating the first set of connection parameters includes identifying a unique connection parameter and inserting a plurality of values of the unique connection parameter into the first set of connection parameters, and the unique connection parameter includes a connection parameter whose value is different in each of the first connection objects.

10. The electronic device of claim 7, wherein:

updating the plurality of first connection objects based on the second set of connection parameters further includes retrieving a value of a common connection parameter from the second set of connection parameters and coping the value of the common connection parameter into each of the first connection objects, the common connection parameter includes a parameter having a same value in each of the second connection objects.

11. The electronic device of claim 7, wherein updating the plurality of first connection objects based on the second set of connection parameters further includes:

retrieving a plurality of values of a unique connection parameter from the second set of connection parameters, and copying each of the plurality of values into a different one of the plurality of first connection objects.

12. An electronic device, comprising:

a memory; and at least one processor operatively coupled to the memory, the at least one processor being configured to perform the operations of:

instantiating a plurality of first connection objects;

generating a first set of connection parameters that is associated with the plurality of first connection objects;

transmitting the first set of connection parameters to a remote device;

receiving from the remote device a second set of connection parameters, the second set of connection parameters being associated with a plurality of second connection objects that are instantiated on the remote device;

updating each of the first connection objects based on the second set of connection parameters; and transmitting, to the remote device, a confirmation that a plurality of communications channels is established, wherein each of the communication channels is associated with a different object pair, each object pair including a respective one of the plurality of first connection objects and a respective one of the plurality of second connection objects, wherein generating the first set of connection parameters includes identifying a derivable connection parameter and inserting only one value of the derivable connection parameter in the first set of connection parameters, the derivable connection parameter includes a connection parameter whose value is different in each of the plurality of first connection objects, such that a first value of the derivable connection parameter in one of the first connection objects is derivable from a second value of the derivable connection parameter in another one of the first connection objects.

* * * * *